United States Patent [19]
Roberts

[11] 3,924,257
[45] Dec. 2, 1975

[54] TRAILER HITCH GUIDE
[75] Inventor: Jack E. Roberts, La Grande, Oreg.
[73] Assignee: Elmer B. Fatzer, Sun City, Ariz.
[22] Filed: June 21, 1973
[21] Appl. No.: 372,068

[52] U.S. Cl. .................. 340/282; 180/98; 280/477; 340/195; 340/275
[51] Int. Cl.² .......................................... G08B 21/00
[58] Field of Search....... 343/112 R, 112 D; 180/98; 244/161; 340/51, 52 R, 282, 195, 275; 280/477

[56] References Cited
UNITED STATES PATENTS

| | | | |
|---|---|---|---|
| 2,818,553 | 12/1957 | Jaffe | 280/477 X |
| 2,955,778 | 10/1960 | Beveridge | 343/112 D |
| 3,046,549 | 7/1962 | Kalmus | 343/112 R |
| 3,121,228 | 2/1964 | Kalmus | 343/112 R |
| 3,734,539 | 5/1973 | Salmi | 340/52 R X |
| 3,825,921 | 7/1974 | Marus et al. | 280/477 X |

Primary Examiner—T. H. Tubbesing
Assistant Examiner—Richard E. Berger
Attorney, Agent, or Firm—Craig & Antonelli

[57] ABSTRACT

A guidance system for assisting the operator of a towing vehicle, during the backing of the latter, provides a transmitter on the vehicle to be towed and a receiver on the towing vehicle which receives a signal from the transmitter and detects from the amplitude and polarity of respective coordinate signals generated thereby, the direction and proximity of the towing vehicle with respect to the towed vehicle.

6 Claims, 6 Drawing Figures

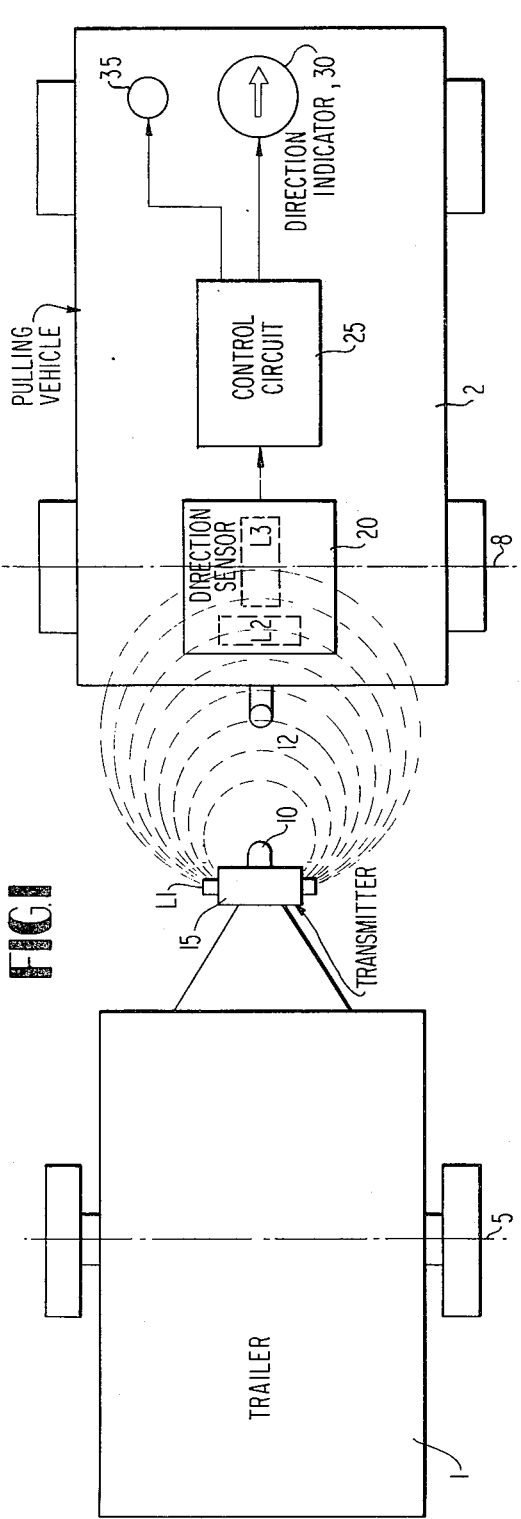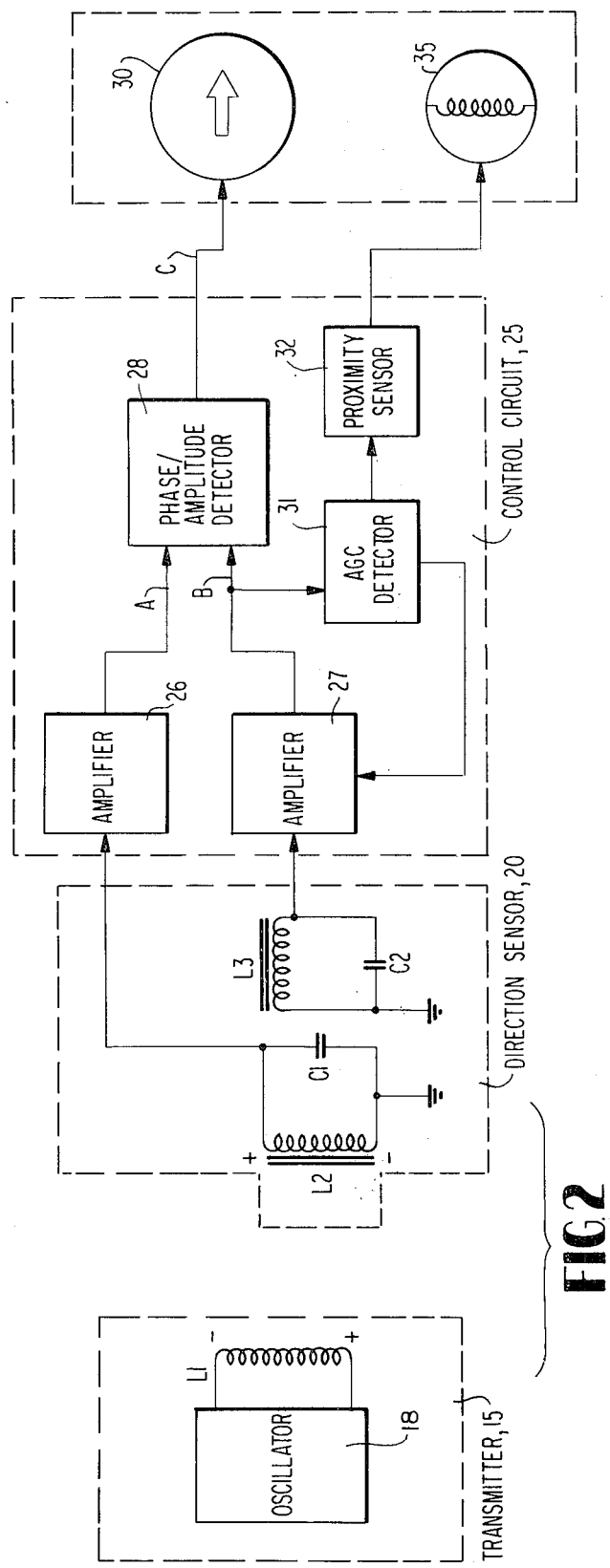

TRAILER HITCH GUIDE

The present invention relates to a guiding system for assisting the operator of an automobile, truck, tractor or other towing vehicle, not only in alignment of the hitch members during backing toward the trailer or other towed vehicle, but after the vehicles are so interconnected, in assisting the operator during backing of the vehicles to properly position the towed vehicle within a desired location.

As will be recognized, without assistance, an operator of a vehicle usually finds it difficult to back into position for connection to a trailer or other towed vehicle where the hitch members are not exactly aligned. Since such members are ordinarily not visible from the driver's seat, he must normally estimate the proper position during backing and then, after making several visual inspections, continue to move the towing vehicle for and aft until such time as he is able to manually shift the tongue of the trailer or the like so as to permit him to interconnect the hitch and the hitch members. Considerable practice and experience are required to properly back a trailer or the like because of the fact that the operator can easily be confused as to which direction to turn the steering wheel in order to cause the trailer to move in a desired direction during the backing operation. In addition, due to the position of the driver within the vehicle, the problem of parallax often occurs which makes it difficult to properly sight the alignment of the vehicle with the trailer or the like.

It is therefore an object of the present invention to provide a guidance system that will assist the operator in both of the aforementioned operations.

Another object of the present invention is to provide a trailer hitch centering device which will greatly simplify the problem of maneuvering the hitch-ball of a pulling vehicle under the ball-connector of the trailer to be pulled.

A further object of the present invention is to provide a system which is electrical in nature and therefore does not require the use of mechanical guidance elements or mechanically actuated detection devices.

Still a further object of the present invention is to provide a system of the aforementioned character in which the visual indicating instrument indicates both the direction and amount of misalignment, and in which a proximity indicator is also provided so as to provide an indication of the proximity of the towing vehicle to the trailer or the like along with the indication of directional alignment.

The trailer hitch centering device in accordance with the present invention consists of a transmitter, a direction sensor, a control circuit, and a direction indicator. The transmitter is located on the hitch of the trailer and the direction sensor is located on the rear of the pulling vehicle, directly above the hitch-ball. The direction sensor is connected electrically to the control circuit, which decodes the direction information received from the direction sensor to provide left and right indication signals to the direction indicator. The control circuit also provides an indication of the proximity of the trailer to the vehicle and actuates a proximity indicator located adjacent the direction indicator in the view of the driver within the vehicle. The direction indicator shows the driver whether he is correctly in line with the ball-connector of the trailer, or if out of line, the direction and amount of the misalignment.

By use of the trailer hitch centering device, only the driver of the pulling vehicle is needed in order to make the proper hookup. He receives all required guidance information by observing the direction indicator, normally located in the cab of the vehicle within easy view of the driver, and the proximity indicator. Since the trailer hitch centering device provides driver positioning information directly to the driver, no parallax problems exist as are inherent in the case of mechanical centering devices. Further, because the units of the centering device are quite small and compact, they can be easily positioned on the trailer and pulling vehicle.

These and other objects, features, and advantages of the present invention will become more apparent from the following detailed description thereof, when taken in conjunction with the accompanying drawings, wherein:

FIG. 1 is a plan view, partly diagrammatic, illustrating a trailer hitch guide in accordance with the present invention and showing the hitch elements properly aligned ready for interconnection;

FIG. 2 is a schematic block diagram of the electrical system in accordance with the present invention;

Figure 3:
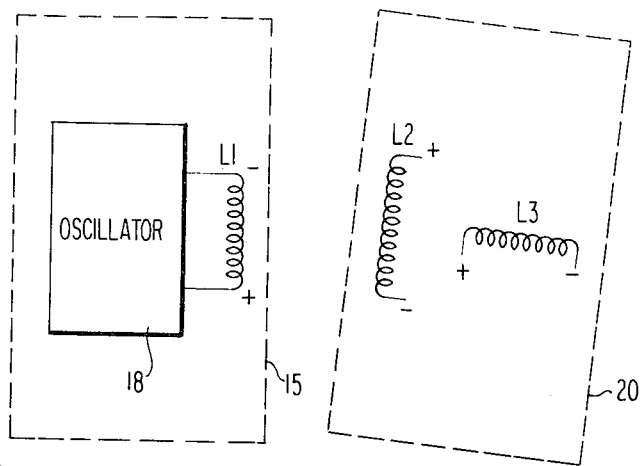
FIGS. 3 and 4 are schematic diagrams of two examples of misalignment between the transmitter and direction sensor.

In reference to FIG. 1 of the drawing, there is illustrated a trailer 1 having a conventional trailer hitch of the ball-and-socket type, provided with hitch members on the tongue 10 of the trailer or other towed vehicle and a ball hitch 12 on the automobile or other towing vehicle extending rearwardly from the rear bumper of the latter. Obviously, any other type of hitch mechanism may also be used. A transmitter 15 is positioned on the tongue of the trailer 1 behind the ball-connector 10, the output coil L1 of the transmitter 15 being positioned parallel to the transverse axis 5 of the trailer, for example, as determined by the trailer axle.

A direction sensor is located on the vehicle side of the hitch-ball 12 and includes a first coil L2 disposed parallel to the transverse axis 8 of the pulling vehicle 2, for example, parallel to the axle thereof, and a second winding L3 disposed perpendicular to the transverse axis 8 and the first winding L2. The output of the direction sensor is connected to a control circuit 25 which serves to provide direction indicating signals and proximity signals in response to the output of the direction sensor 20. The direction indicating signal is applied to an indicator 30 and the proximity indicating signal being applied to an indicator 35. The control circuit 25 may be located at a distance from the direction sensor, for example, on the trunk lid, in the trunk, or in the passenger compartment of the vehicle. The direction indicator 30 is preferably located within the view of the driver of the pulling vehicle, for example, on the dashboard or adjacent thereto, and the proximity indicator 35 is preferably located closely adjacent to the direction indicator 30 so that both indicators may be viewed simultaneously.

In operation, as indicated above, when the transmitter is energized, for example, from a battery source contained within the transmitter, a magnetic field is created by the coil L1, which magnetic field extends outwardly in waves of increasing diameter so as to encompass the coils L2 and L3 in the direction sensor 20.

With the trailer 1 and pulling vehicle 2 positioned in-line, as shown in FIG. 1, the coil L2 of the direction sensor 20 will produce an output current in the manner of a secondary winding of a transformer energized by the primary winding formed by the coil L1 of the transmitter 15. Maximum energy is coupled from the winding L1 to the winding L2 due to the fact that the two windings are disposed in parallel relationship to one another; however, as is well known, minimum energy will be coupled to the winding L3 from the winding L1, because the two windings are oriented 90° with respect to one another.

The control circuit 25 decodes the outputs from coils L2 and L3 in the direction sensor 20 to provide a direction indication signal which is applied to the direction indicator 30, causing the indicator pointer to deflect to one side or the other indicating orientation to the left or right, or to remain in its neutral position indicating alignment between the trailer 1 and the pulling vehicle 2. In the latter case, the hitch-ball of the pulling vehicle 1 will be directly in-line with the ball-connector of the trailer, indicating that the angle of approach of the pulling vehicle is correct.

When the pulling vehicle is approaching from the wrong angle, or is displaced laterally, the polarity and magnitude of the energy coupled into the coil L3 from the transmitter coil L1 changes. As a result, the output from the control circuit 25 will cause a deflection of the indicator needle to the left or right indicating that the direction of the front end of the pulling vehicle must be moved in that direction in order to achieve correct pulling vehicle-to-trailer alignment.

The control circuit 25 also provides from the signals derived from coils L2 and L3 in the direction sensor 20 a proximity signal which is applied to the indicator 35 so as to provide information to the driver concerning the proximity of the pulling vehicle to the trailer.

FIG. 2 illustrates in greater detail the electrical system of the trailer hitch centering device in accordance with the present invention, as basically illustrated in FIG. 1. The transmitter 15 consists of an oscillator 18, which may provide an output in the range of 80 KHZ to an oscillator coil L1 so as to create a magnetic field of a magnitude sufficient to be detected at a distance in excess of 15 feet, for example. The frequency of 80 KHZ is merely exemplary, other frequencies also being usable to achieve the same effects; however, component size and circuit operation is optimum at this particular frequency. The oscillator 18 is of the conventional type, preferably transistorized, which is powered by a self-contained battery (not shown) to achieve maximum selection in placement of the transmitter and minimum power loss; however, the only critical criterion concerning the oscillator is the proper disposition of the transmitter with its output coil L1 disposed parallel to the transverse axis 5 of the trailer.

The direction sensor 20 consists of the detector coils L2 and L3, as described in connection with FIG. 1, the two coils being mounted in the same generally horizontal plane but rotated 90° with respect to one another. Two capacitors C1 and C2 are provided across the respective coils to form resonance circuits which are tuned to the frequency of the transmitter 15, for example, 80 KHZ. When the coils L2 and L3 are positioned as shown in FIG. 2 with respect to the oscillator coil L1, maximum energy is coupled to the coil L2 and minimum energy is coupled to the coil L3. The output from the resonance circuit formed by the coil L2 and the capacitor C1 is applied an an amplifier 26 in the control circuit 25 and is then applied to a phase-amplitude detector 28 as a reference signal. The output from the resonance circuit formed by coil L3 and capacitor C2 is applied to an amplifier 27, whose output is applied to a second input of the phase-amplitude detector 28 as a direction signal.

With correct alignment between the pulling vehicle 2 and the trailer 1, the output of the coil L3 will be a minimum, as already described, so that the output signal from the amplifier 27 will be essentially zero as applied to the phase-amplitude detector 28. As a result, the detector will produce no output to the direction indicator. With no signal applied to the indicator 30, the pointer of the direction indicator remains centered, indicating that the pulling vehicle is properly positioned with respect to the trailer.

If the direction sensor is rotated clockwise slightly, as shown in FIG. 3, or is shifted laterally, a signal of substantially the same magnitude is coupled to the coil L2; however, a measurable signal is now coupled to the coil L3 of the direction sensor 20. With the oscillator coil L1 having a polarity orientation as indicated in FIG. 3, the signal coupled to the coil L3 will have the polarity also indicated in the figure. As the direction sensor is rotated clockwise, the polarity of the signal coupled into the coil L3 remains the same with respect to the coil L1; however, the amplitude of the signal coupled to the coil L3 increases with the degree of rotation.

Figure 4:
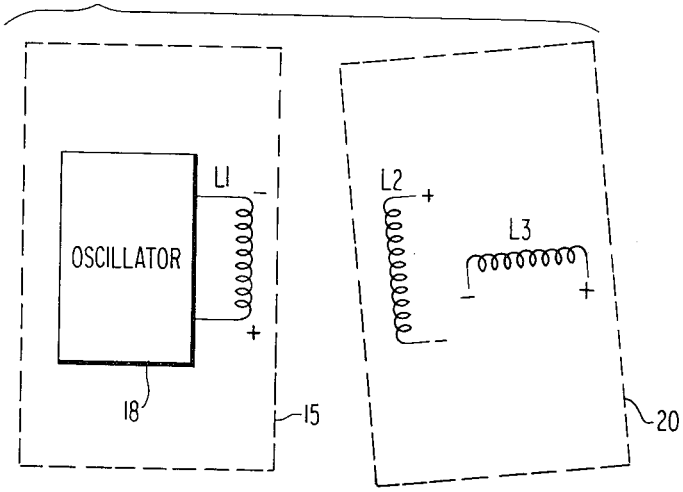

When the direction sensor 20 is rotated counter-clockwise, as seen in FIG. 4, the signal coupled to the coil L3 will have a polarity such as seen in the figure, which is opposite to the polarity provided by the orientation of FIG. 3. Again, as the degree of rotation of the direction sensor 20 increases, the level of the signal generated in the coil L3 also increases. Therefore, the polarity of the output signal from coil L3 can be used to indicate the direction of misalignment, while the amplitude of the output from the coil L3 can be used to indicate the degree of misalignment.

Figure 5A:
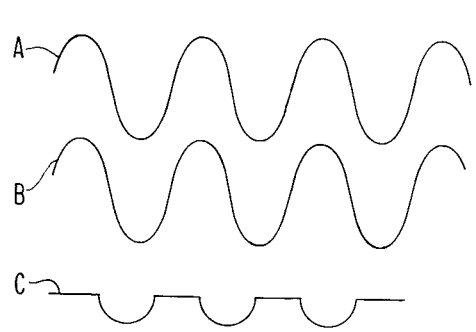
FIGS. 5A and 5B are waveform diagrams relating to the conditions illustrated in FIGS. 3 and 4, respectively.

Under the condition where the direction sensor 20 is rotated in a clockwise direction with respect to the transmitter 15, as seen in FIG. 3, operation of the control circuit 25 can best be seen by referring to the waveforms of FIG. 5A. Waveform A is the amplified output from the coil L2 in the direction sensor 20. This signal serves as a reference and keys the phase-amplitude detector 28 in the control circuit 25. Waveform B is the amplified output from the coil L3. This is the direction signal and causes the direction indicator pointer to deflect. On the negative half-cycles of the waveform A, one half cycle of waveform B is passed by the phase-amplitude detector 28 to the direction indicator meter 30. In the case of FIG. 3, wherein the direction sensor is rotated in a clockwise direction with respect to the transmitter 15, the negative half-cycles of waveform B are passed to the indicator 30. This will cause the meter to deflect to the left indicating that the front of the pulling vehicle must be moved left to correct the alignment error. If the degree of alignment error is small, the meter deflection will also be correspondingly small; however, as the degree of misalignment increases, the amount of meter deflection increases with increase in the signal provided at the output of the detector 28.

Figure 5B:
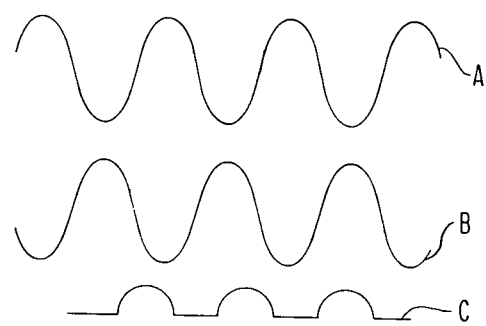

If the misalignment between the trailer 1 and vehicle 2 is a result of relative rotation of the direction sensor 20 in a counterclockwise direction, as seen in FIG. 4, the signals in the control circuit 25 will take the form shown by the waveform diagrams of FIG. 5B. It will be noted in this case that the phase of the waveform B has changed 180° with respect to the waveform A due to change in polarity of the signal induced in the coil L3 of the direction sensor 20. As a result, the positive half-cycles of the waveform B are passed through the phase-amplitude detector 28 to the direction indicator meter 30. This causes the meter to deflect to the right instead of to the left, indicating that the front of the pulling vehicle must be moved right to correct the alignment error. Once again, the extent of meter deflection varies in direct proportion to the degree of misalignment as indicated by the level of the output signal from the detector 28.

The control circuit 25 also includes an automatic gain control detector 31 connected to the output of amplifier 27 and serves the purpose of preventing the amplifier 27 from saturating when the pulling vehicle and the trailer are in close proximity. If this were not done, a direction indication would be given but the degree of misalignment would not be determined since the meter would indicate a full deflection to one side or the other on all but the slightest misalignment.

The control circuit 25 also includes a proximity sensor 32, which may take the form of a conventional amplitude detector, connected to the output of the automatic gain control detector 31 for monitoring the distance from the transmitter to the direction sensor at all times, using the automatic gain control as a base reference. As the units move toward each other, the proximity sensor 32, upon reaching a predetermined distance, activates a visible or audible signal provided by the indicator 35. This alerts the driver of the pulling vehicle that the hitches are in a mating position or at a predetermined distance from the actual mating position. In other words, when the indicator 35 is activated, the driver is informed that he has not only achieved alignment between the pulling vehicle and the trailer, as provided by the indicator 30, but that the vehicle and the trailer are sufficiently proximate to one another to enable coupling between the hitches.

In summary, the trailer hitch centering device of the present invention provides the pulling vehicle operator with continuous, accurate information concerning the alignment of the hitch-ball of his vehicle with respect to the ball-connector on the trailer. This information consists of the direction of error and the degree of error and the distance from the actual mating position. The device is easily attached and removed from both trailer and pulling vehicle and permits proper positioning of the vehicle with respect to the trailer by a single person, the driver of the pulling vehicle, to correctly back the vehicle into a position for trailer hookup.

The various elements of the circuit of FIG. 2 are conventional devices which are commercially available, and so the system may be produced at low cost. These circuits are preferably of the transistorized type to provide units of small size requiring low power for operation. In this regard, the phase-amplitude detector 28 typically includes two amplifying channels connected to an output stage formed by a field effect transistor. One channel may be connected to the gate electrode of the transistor while the other channel is connected to the source electrode thereof along with the direction indicator 30, so that the output of the transistor is determined by the amplitude and polarity of the signal from the one channel as compared to the reference signal provided by the other channel.

What is claimed is:

1. A guidance system for indicating the direction of relative movement and proximity of a towing vehicle to a towed vehicle comprising coupling means for connecting the rearmost end of a towing vehicle to the forwardmost end of a towed vehicle, including a first coupling element on said towing vehicle and a second coupling element on said towed vehicle, whereby the position of said first coupling element with respect to said second coupling element changes with relative movement of said vehicles, transmitter means positioned on said towed vehicle for transmitting a signal forwardly from said forwardmost end of said towed vehicle with a prescribed directional orientation with respect to said towed vehicle, receiver means positioned on said towing vehicle for detecting the angular relationship and proximity of said receiver means to said transmitter means from the directional orientation of said transmitted signal, said receiver means including a direction sensor comprising first and second coils arranged transversely and in parallel to the longitudinal axis of said towing vehicle, respectively, first and second capacitors connected across said first and second coils, respectively, to form circuits therewith which are tuned to the frequency of the signal transmitted by said transmitter means, first and second amplifiers connected to said first and second coils, respectively, a phase-amplitude detector having first and second inputs connected to the outputs of said first and second amplifiers, respectively, and providing a first output signal having an amplitude and polarity indicative of the magnitude and direction of misalignment between the longitudinal axes of said towing and towed vehicles, an automatic gain control circuit connected to the output of said second amplifier for controlling the gain thereof, and a proximity detector connected to said automatic gain control circuit for providing a second signal indicating the proximity of said receiver means to said transmitter means by detecting the amplitude of the current derived from said second coil, and indicator means connected to said receiver means for indicating the angular relationship between said vehicles and the proximity of said towing vehicle to said towed vehicle in response to the first and second signals derived from the output of said receiver means.

2. A guidance system as defined in claim 1, wherein said transmitter means includes an oscillator and a field generating coil connected to said oscillator and oriented to generate a field having said prescribed directional orientation with respect to said towed vehicle.

3. A guidance system as defined in claim 2, wherein said field generating coil has its longitudinal axis parallel to the transverse axis of said towed vehicle so as to generate said field in the forward direction along the longitudinal axis of said towed vehicle.

4. A guidance system as defined in claim 1, wherein said indicator means includes a first indicator connected to said proximity detector for providing an indication when said first and second coupling elements are in alignment.

5. A guidance system as defined in claim 4, wherein said indicator means further includes a second indicator responsive to said first signal for indicating the direction and extent of misalignment between said towing vehicle and said towed vehicle.

6. In a guidance system for assisting the operator of a towing vehicle, a method comprising the steps of:
   a. providing respective coupling elements on said towing vehicle and a towed vehicle for coupling said towing vehicle to said towed vehicle,
   b. transmitting from said towed vehicle a signal having a prescribed directional orientation with respect to said towed vehicle,
   c. receiving in said towing vehicle said signal from said towed vehicle,
   d. analyzing said received signal to detect the angular relationship and proximity of said towed vehicle to said towing vehicle,
   e. indicating to said operator of said towing vehicle said detected angular relationship and proximity of said towed vehicle to said towing vehicle,
   f. repositioning said towing vehicle with respect to said towed vehicle in response to said indicating so as to diminish the angular deviation and proximity of said towed vehicle with respect to said towing vehicle,
   g. repeating steps (b) through (f) until said analyzing and indicating infer that the longitudinal axes of said towing and towed vehicles are aligned and said coupling elements are aligned, and
   h. coupling said towing vehicle to said towed vehicle when said longitudinal axes of said towing and towed vehicles are aligned and said coupling elements are aligned.

* * * * *